United States Patent
Baitinger et al.

(10) Patent No.: US 7,076,575 B2
(45) Date of Patent: Jul. 11, 2006

(54) METHOD AND SYSTEM FOR EFFICIENT ACCESS TO REMOTE I/O FUNCTIONS IN EMBEDDED CONTROL ENVIRONMENTS

(75) Inventors: Friedemann Baitinger, Jettingen (DE); Gerald Kreissig, Herrenberg (DE); Juergen Saalmueller, Boeblingen (DE); Frank Scholz, Grafenau (DE)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 10/713,822

(22) Filed: Nov. 14, 2003

(65) Prior Publication Data

US 2004/0215846 A1 Oct. 28, 2004

Related U.S. Application Data

(63) Continuation of application No. PCT/EP02/04837, filed on May 3, 2002.

(51) Int. Cl.
*G06F 13/28* (2006.01)
*G06F 3/00* (2006.01)

(52) U.S. Cl. .............. 710/28; 710/3; 710/4; 710/5; 710/9; 710/8; 716/1; 716/3; 716/16; 717/173

(58) Field of Classification Search .............. 710/3–5, 710/8, 9, 28; 716/1, 3, 16; 717/173
See application file for complete search history.

(56) References Cited

U.S. PATENT DOCUMENTS 6,438,737 B1 * 8/2002 Morelli et al. .............. 716/16
6,479,792 B1 * 11/2002 Beiermann et al. ...... 219/130.5
6,591,358 B1 * 7/2003 Jaffrey .......................... 712/32

FOREIGN PATENT DOCUMENTS

WO WO 02/983343 A2 5/2002

OTHER PUBLICATIONS

Einfuhrun in die Mikrocomputer-Technik (pp. 5-20 to 5-35), 1982, TE-WI Verlag GmBH, Munchen Germany XP002251989.
"16-Bit Generation Z8000 Aufbau und Anwendung Passage", Peter Stuhlmuller, pp. 2-16-2-21, XP002241988.

* cited by examiner

*Primary Examiner*—Tammara Peyton
(74) *Attorney, Agent, or Firm*—John E. Campbell; Floyd A. Gonzalez

(57) ABSTRACT

A method for accessing I/O devices in embedded control environments is provided, wherein said I/O devices are remotely attached to an embedded microprocessor. By mapping said I/O devices' resources to said microprocessor's address or memory address space, existing device drivers can be reused and the time-to-market capability is greatly improved.

26 Claims, 4 Drawing Sheets ured through custom device interface software. The
METHOD AND SYSTEM FOR EFFICIENT ACCESS TO REMOTE I/O FUNCTIONS IN EMBEDDED CONTROL ENVIRONMENTS The present application is a continuation of copending international patent application Ser. No. PCT/EPO2/04837 filed May 3, 2002 as a PCT application.

FIELD OF THE INVENTION

The present invention relates, in general, to accessing I/O functions. More specifically, the invention relates to accessing I/O functions that are remotely attached to a microcontroller. Still more specifically, the present invention deals with accessing such remotely attached I/O functions in embedded control environments.

BACKGROUND OF THE INVENTION

In distributed embedded control environments I/O engines are often remotely attached to the embedded controller through a serial link. Typically access to these devices is facilitated by directly programming the serial link controller hardware.

FIG. 1 shows such an environment where an embedded controller needs to operate a series of I/O devices which are attached at the remote end of a link.

At the lowest level a microprocessor accesses I/O resources either through its I/O address space for architectures such as the Intel x86, or through its memory address space for architectures such as the IBM PowerPC architecture. The software entity that controls the hardware at this level is usually called a Device Driver. Towards higher level software applications the Device Driver provides a generic view of the device. In UNIX systems, it is typically visible in the hierarchical file-system name space in the /dev tree and access to it is facilitated using regular file-system semantics and interfaces like:
 open( );
 close( );
 read( );
 write( );
 ioctl( )

In embedded control applications it is not always possible to attach all I/O devices such that they can be directly addressed at the microprocessor bus level as shown in FIG. 2. The I/O functions are often implemented in a standalone ASIC which can be attached to the embedded controller's microprocessor via some link hardware. Consequently, the resources of the I/O devices are not directly visible in the I/O address space or memory address space of the microprocessor. What is visible to the microprocessor though are the resources of the link hardware that connects the I/O ASIC with the embedded controller.

Since no existing device driver can be used in this situation the full software path to the I/O devices needs to be facilitated through custom device interface software. The need for this custom device interface software is a limiting factor for time-to-market which is often key in the embedded control market nowadays.

In addition custom implementation of the device driver layer increases the probability of shipping software bugs to the field which cannot be easily recovered from. Unlike regular PC applications where it is relatively simple to download a new version of a previously buggy application over the Internet, it is not easily possible to replace faulty software in embedded control applications.

Until recently this problem did not exist because embedded control applications traditionally used custom operating systems, custom device drivers, and custom hardware. Since the problem is rather new, standard solutions are not yet available, however, with the emerging push towards standardization in embedded control environments new solutions will become more prevalent.

A major driver towards this standardization is Linux and the overall OpenSource movement.

SUMMARY OF THE INVENTION

It is therefore an object of the present invention to provide a method for accessing I/O devices in embedded control environments thereby greatly reducing the programming effort.

BRIEF DESCRIPTION OF THE DRAWINGS

The invention will in the following be described in more detail in conjunction with the drawings, in which.

DETAILED DESCRIPTION OF THE PREFERRED EMBODIMENT

The present invention allows for reuse of existing device drivers which are available for common I/O devices as long as they are mapped to the processor's I/O- or memory-address space in well known locations and with a well known layout. Reusing existing device driver code greatly improves the time-to-market capability and it reduces the software test effort as well.

It has to be mentioned that the present invention does not change the existing device drivers but adapts them to a fictitious device.

For remote but well known device types such as serial ports which are often referred to as UARTs (Universal Asynchronous Receiver/Transmitter) where device drivers exist for nearly all operating systems and Real Time Control Programs (RTOS), a Device Abstraction Layer (in the following called "DAL") is provided which maps the devices' resources into the microprocessor I/O address space or memory address space as if the remote device was locally available to the microprocessor.

Table 1 shows an example of UART resources as they are visible to the microprocessor as registers either in the I/O address space or the memory address space. By doing so, it is possible to instantly reuse existing device drivers and all the existing application software that uses them without the need to rewrite a vast amount of complex code.

TABLE 1

UART Registers

| Offset | R/W | Description |
|---|---|---|
| 0 | R | Receive Buffer |
|   | W | Transmitter Holding Register |
| 1 | R/W | Interrupt Enable Register |
| 2 | R | Interrupt Identification Register |
| 3 | R/W | Line Control Register |
| 4 | R/W | Modem Control Register |
| 5 | R | Line Status Register |
| 6 | R | Modem Status Register |
| 7 |   | Unused |
| 8 | R/W | Divisor Latch (LSB) |
| 9 | R/W | Divisor Latch (MSB) |

The implementation of the DAL is done in either one of the following ways:

1. Embedding control hardware to redirect the requests and responses over the link to the remote device and still maintain the device abstraction.
2. Using the microprocessor's memory management unit to cause a program exception as soon as the DAL's resources are accessed which is done by providing a thin layer device abstraction which executes in the context of the exception handler.

Figure 1:
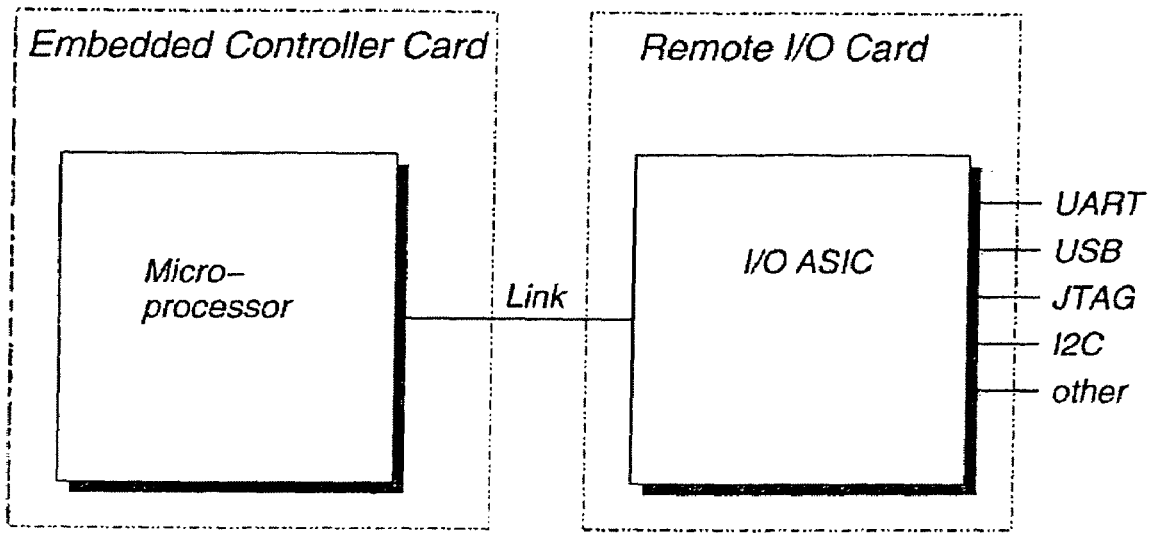
FIG. 1 schematically shows an I/O card remotely attached to a microprocessor according to the state of the art.
Figure 2:
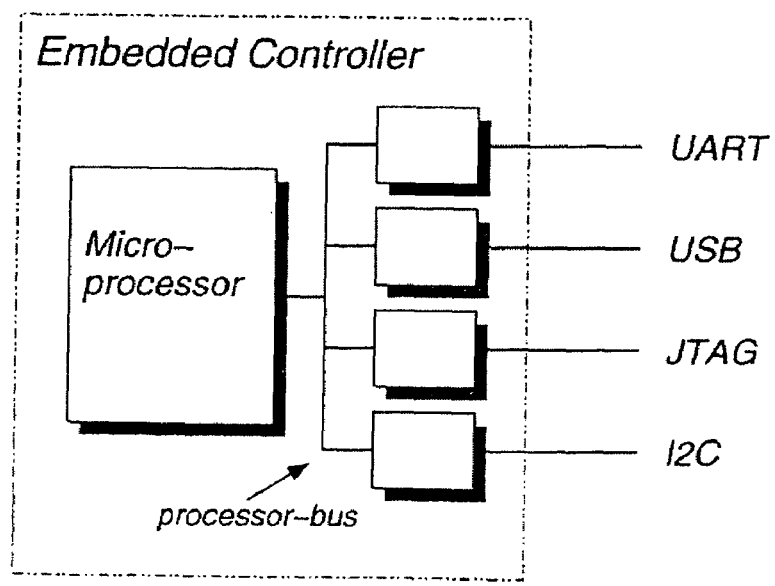
FIG. 2 schematically depicts a microprocessor bus attached I/O.
Figure 3:
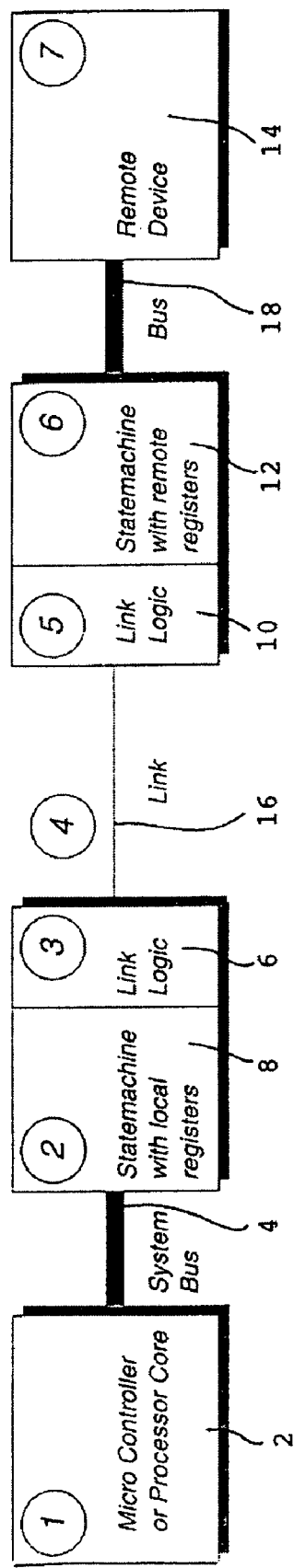
FIG. 3 schematically shows a hardware solution according to the invention.

As to the hardware solution, FIG. 3 shows how a microcontroller 2 or equivalent processor core within an ASIC device accesses the link logic 6 by a system bus 4 via a local register set 8 combined with a state machine. The link logic 6 may communicate with a respective link logic 10 of the remote device, e.g., by using an appropriate and suitable protocol via link 16. The link logic 10 connects to a remote register set 12 containing a second state machine and attaches to the remote device 14 via a bus 18. It has to be mentioned that the link logic 6 can be any kind of a data exchange (data link) between two stations A and B. This may be achieved by a simple serial interface, a LAN, a private network or a global network, etc., but is not restricted thereto.

The microcontroller 2 triggers, e.g., a read or write operation to the remote device 14 by writing to the local register set 8. This in turn activates the state machine in 8 and controls the transfer of data to the link logic 6. The link logic units 6 and 10 transfer the request posted in 8 to the register set 12 and subsequently activate the respective state machine to execute the requested operation in 14, i.e., to write or read any data to/from the remote device 14.

After completion of the operation the state machine 12 triggers a response to be sent back via the link 16 and stored in a register of unit 8. This action may also cause a notification to the micro controller, e.g., an interrupt. Units 2, 6 and 8 may be designed as one single ASIC device integrating all functions or by use of standard vendor components that are interconnected as discrete modules.

The same approach is valid for the units 10, 12 and 14. While the link hardware 6, 10, 12 and 16 is required to overcome the physical distance between units 2 and 14, unit 8 may translate partially or fully to a software layer below the DAL. This allows for cost tradeoffs between hardware and software.

Solution 1 mentioned above is used for rather simple I/O controllers where the hardware design effort is affordable and where performance requirements dictate it.

Solution 2 is a software solution and is used where the hardware cost cannot be afforded but one can live with the overhead of entering and leaving the exception handler context. This solution will be described in more detail in the following.

Figure 4:
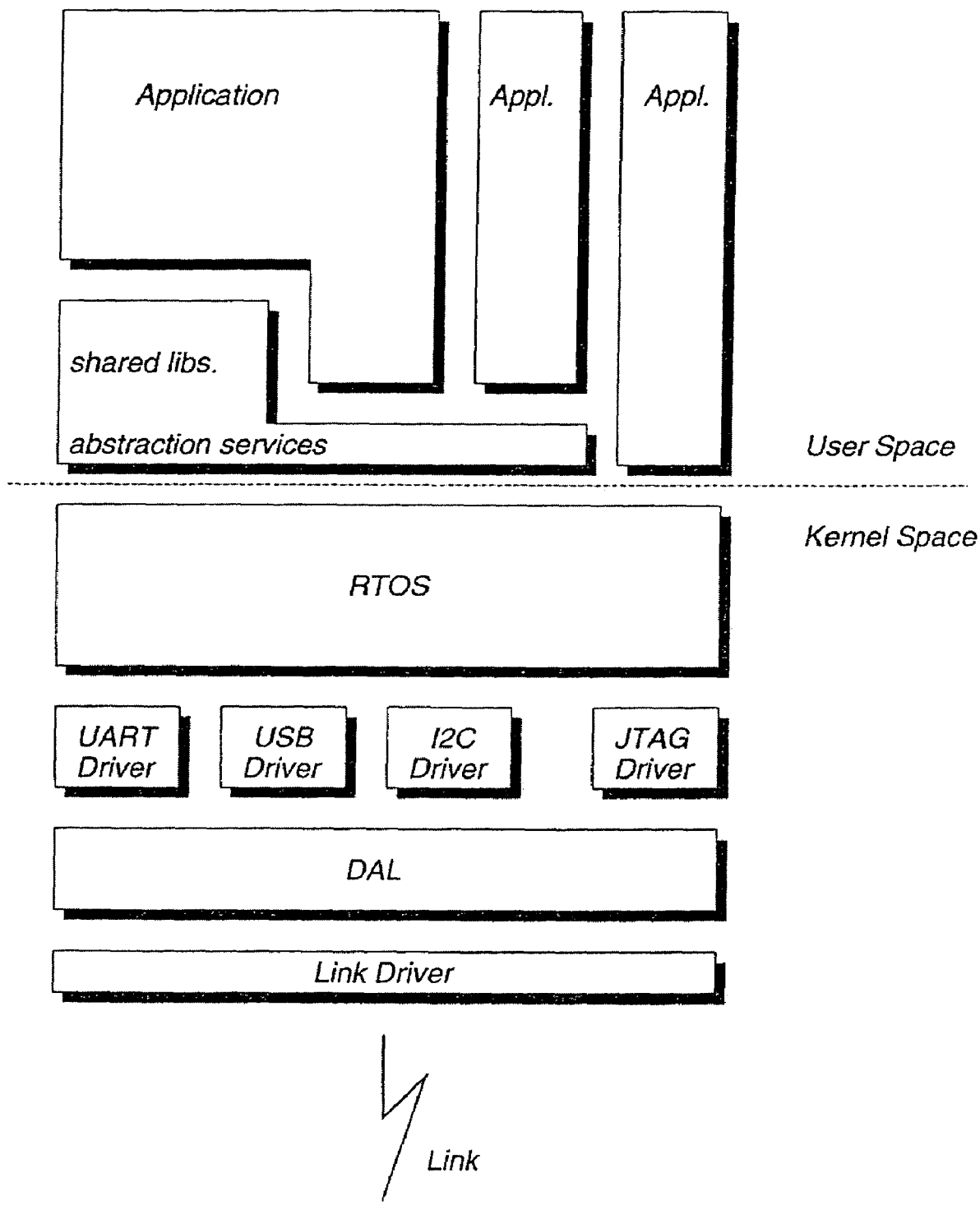
FIG. 4 schematically depicts a software structure with a Device Abstraction Layer (DAL) according to the present invention.

FIG. 4 schematically depicts a software structure with a Device Abstraction Layer (DAL) according to the present invention.

The general mechanism used by the DAL implementation is a means for generating an exception during instruction execution upon accessing a virtual resource that does not physically exist.

Two methods may be used to trigger the DAL, i.e.,

1) Use of the microprocessors' management unit's capability to generate an exception upon accessing a memory location where no real memory is mapped to; and
2) Use of the microprocessors' execution unit's capability to generate an exception upon execution of a privileged instruction.

The following description of the DAL operation is based on method 1 but is also applicable to methods 2 and 3.

The Device Abstraction Layer "DAL" facilitates the virtualization of the remotely attached device and makes it appear to device driver software as if it was locally attached to the microprocessor bus.

Figure 5:
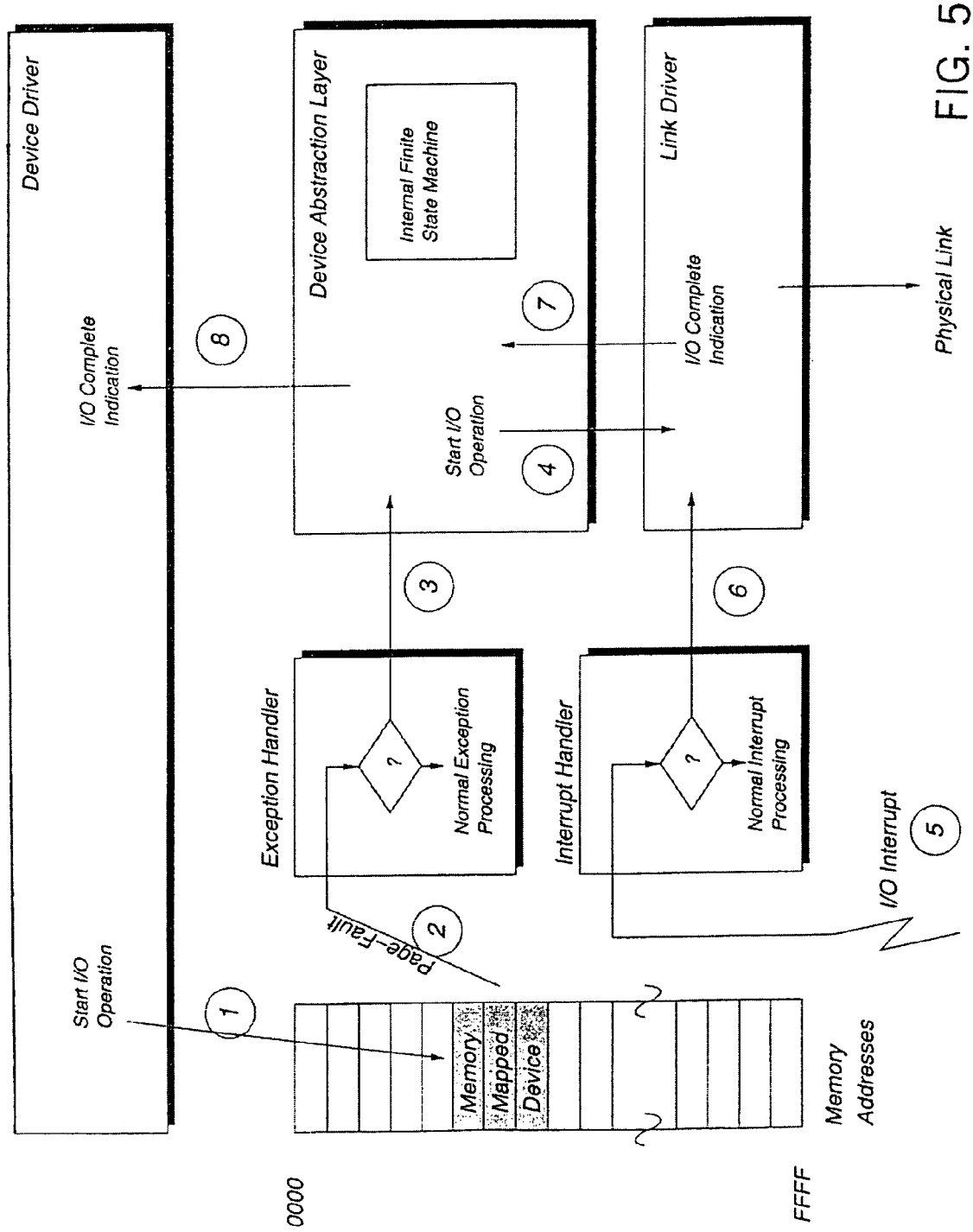
FIG. 5 schematically depicts a sequence of events describing the DAL operation according to the invention.

The following sequence of events as shown in FIG. 5 describes the operation of the DAL according to the described software solution and shows how it interacts with the rest of the system:

During steady state operation, at some point in time the device driver for the virtual device may want to issue an I/O operation to the remote device. The device driver writes to the appropriate memory area in the microprocessor's memory address range (Step 1).

The Memory Management Unit of the microprocessor has been programmed such that read/write accesses to the relevant address range cause a Page-Fault Exception (Step 2).

Subsequently, the Page-Fault Exception Handler is invoked and a decision is made whether the exception needs to be handled by the DAL or treated like a regular page-fault.

The Exception Handler transfers control to the DAL (Step 3). It provides sufficient information for the DAL to decode the operation that the device driver actually wanted to perform with the device.

The DAL updates its internal state machine accordingly and issues the Start-I/O operations (Step 4) to the real device over the Link Driver as needed.

Once the I/O operation is complete at the remote device, an I/O complete interrupt is signaled to the microprocessor (Step 5).

Now, the interrupt handler decodes the interrupt source and passes control to the I/O complete handler in the Link Driver (Step 6).

The Device Abstraction Layer "DAL" facilitates the virtualization of the remotely attached device and makes it appear to device driver software as if it was locally attached to the microprocessor bus. AS shown in FIG. 4, the attached devices may include any of universal Asynchronous Receiver/Transmitter (UARP), universal Serial Bus (USB). Joint Test Action GrOUP (JTAG), and IC Bus (I²C) devices.

The DAL retrieves the I/O information from the device via the Link Driver, updates its internal finite state machine tables and signals an I/O complete event to the device driver (Step 8).

The device driver issues read/write operations to the memory map of the device in order to obtain status of the I/O operation. Access to these memory locations again causes page-fault exceptions which are fed to the DAL which knows the relevant information from the I/O device already and thus can make it available to the device driver by completing the interrupted memory read/write operations.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method for accessing I/O devices in embedded control environments, the method comprising: remotely attaching said I/O devices to an embedded microprocessor; mapping said I/O devices resources to said microprocessor; address or memory address space; generating an exception upon accessing a mapped virtual resource unit; and handling said exception with an exception handler to operate said remote I/O devices as if locally attached to said embedded microprocessor.

2. The method according to claim 1 further comprising selecting said I/O devices from the group consisting of universal Asynchronous Receiver/Transmitter (UART), Universal Serial Bus (USB), joint Test Action Group (JTAG), and IC Bus (I$_2$C).

3. The method according to claim 1 wherein said mapping step is performed by a device abstraction layer (DAL).

4. The method according to claim 3 wherein said DAL is implemented via extra embedded control hardware.

5. The method according to claim 3 wherein said DAL is implemented via software.

6. The method according to claim 4 further comprising redirecting by said extra embedded control hardware, requests and responses over a link to a remotely attached device.

7. The method according to claim 5 wherein said microprocessor has a memory management unit, and further comprises said DAL using said memory management unit to cause a program exception which is handled by said exception handler.

8. The method according to claim 7 further comprising executing with a thin layer device provided in the context of said exception handler.

9. The method according to claim 7 further comprising generating an exception during instruction execution upon said accessing of said virtual resource unit.

10. The method according to claim 9 wherein said microprocessor has a management unit, and further comprises generating with the management unit, an exception upon execution of a privileged instruction.

11. A computer system for accessing I/O devices in embedded control environments, said I/O devices being remotely attached to an embedded microprocessor, said system comprising: a device mapping said I/O devices' resources to said microprocessors address or memory address space; an exception generating unit generating an exception upon accessing a mapped virtual resource unit; and an exception handler handling said exception to operate said remote I/O devices as if locally attached to said embedded microprocessor.

12. The computer system according to claim 11 wherein said device is a device abstraction layer (DAL).

13. The computer system according to claim 12 wherein said DAL is implemented via extra embedded control hardware.

14. The computer system according to claim 12 wherein said DAL is implemented via software.

15. The computer system according to claim 14 further comprising resources available to said DAL and wherein said exception generating unit is software adapted to cause a program exception as soon as said resources are accessed.

16. The computer system according to claim 15 further comprising a thin layer device abstraction causing said program exception.

17. A program product for accessing I/O devices in embedded control environments, said I/O devices being remotely attached to an embedded microprocessor, said program product comprising: a computer readable medium having recorded thereon computer readable program code performing the method comprising: mapping said I/O devices resources to said microprocessor's address or memory address space; generating an exception upon accessing a mapped virtual resource unit; and handling said exception with an exception handler to operate said remote I/O devices as if locally attached to said embedded microprocessor.

18. The program product according to claim 17 wherein said method further comprises selecting said I/O devices from the group consisting of universal Asynchronous Receiver/Transmitter (UART), Universal Serial Bus (USB), Joint Test Action Group (JTAG), and IC Bus (I$^2$C).

19. The program product according to claim 17 wherein said mapping step of said method is performed by a device abstraction layer (DAL).

20. The program product according to claim 19 wherein said DAL is implemented via extra embedded control hardware.

21. The program product according to claim 19 wherein said computer readable program code includes computer readable program code for implementing said DAL.

22. The program product according to claim 21 wherein said method further comprises redirecting requests and responses over a link to a remotely attached device.

23. The program product according to claim 22 wherein said method further comprises said DAL causing a program exception which is handled by said exception handler.

24. The program product according to claim 23 wherein said method further comprises said DAL causing a program exception by a thin layer device provided in said exception handler.

25. The program product according to claim 23 wherein said method further comprises generating an exception during instruction execution upon said accessing of said virtual resource unit.

26. The program product according to claim 25 wherein said method further comprises generating an exception upon execution of a privileged instruction.

* * * * *